J. H. Stimpson,
Butter Dish.
Nº 20,902.                    Patented July 13, 1858.
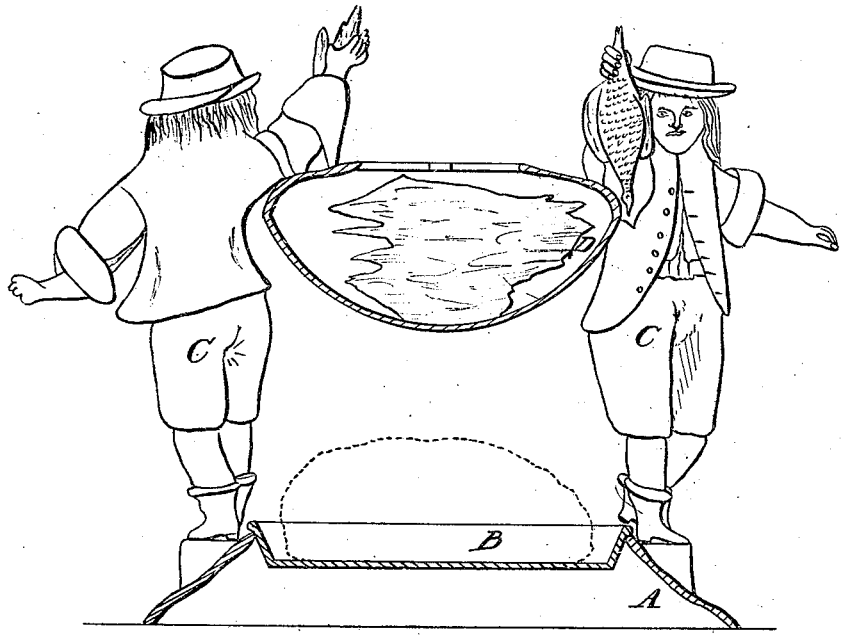

UNITED STATES PATENT OFFICE.

J. H. STIMPSON, OF BALTIMORE, MARYLAND.

BUTTER-COOLER.

Specification of Letters Patent No. 20,902, dated July 13, 1858.

*To all whom it may concern:*

Be it known that I, JAMES H. STIMPSON, of Baltimore, in the State of Maryland, have invented a new and Improved Butter-Cooler; and I do hereby declare that the following is a full, clear, and exact description of the same, reference being had to the annexed drawing, making a part of this specification, said drawing being a vertical central section of my improvement.

This invention relates to a new and improved article for the table, designed for keeping butter in a cool hard state during meal times in warm weather.

The invention consists in having an ice receptacle supported over a butter dish as hereinafter shown, so that the butter will be cooled by the cool air which descends upon it in consequence of being of greater specific gravity than the surrounding atmosphere.

To enable those skilled in the art to fully understand and construct my invention I will proceed to describe it.

A, represents a base or stand which may be of annular form the opening at the center receiving a butter dish B.

C, C, are two supports placed at opposite sides of the base A, and D, is an ice receptacle which is sustained by the supports. The ice receptacle is placed directly over the butter dish and a short distance above it as shown in the drawing.

The base A, supports C, C, and ice receptacle D, may be of cast metal, electroplated if desired, and a chaste and appropriate design may be adopted, one that will be ornamental for the table. The butter dish B, may also be of metal, or, porcelain, glass, or other material may be used. The dish B, is merely fitted loosely in the base so that it may be readily detached or lifted out and placed in it.

The ice in D, cools the surrounding air which, in consequence of its superior gravity, falls on the butter below in the dish B, keeping the butter in a cool hard state.

It is designed to have the ice receptacle D, sufficiently large to contain enough ice to last during a meal time, or longer, say an hour and a half.

It will of course appear evident to every one that this plan is far preferable to having a dish placed on a vessel containing ice or to laying ice on the butter in order to cool it, for in the former case all of the benefit of the ice is not obtained and in the latter case the ice in melting soon floods the butter and neither of the plans prevent flies and other insects from lighting on the butter. In my improvement the butter, in fact the whole implement is surrounded by a cold atmosphere and insects will not penetrate it. In flying around in the warm atmosphere and reaching the cold, the transition from warm to cold is so sudden and the change so great, that they instantly shun the device. The butter therefore will not only be kept in a cool state, but also kept free from insects. No exterior covering is required, the butter is always accessible and the device may be made quite portable, and also admits of being made quite ornamental.

I do not claim, broadly, the placing of the ice above the butter. But—

I claim and desire to secure by Letters Patent, as an improved article of manufacture—

A butter cooler made substantially as herein shown and described, to wit:—with an ice receptacle D suspended over the dish B, in the manner and for the purposes set forth.

JAMES H. STIMPSON.

Witnesses:
GEO. NEILSON,
WM. H. HAYWARD.